United States Patent
Guo

(12) 
(10) Patent No.: US 6,622,970 B2
(45) Date of Patent: Sep. 23, 2003

(54) METHOD AND APPARATUS FOR AUTONOMOUS SOLAR NAVIGATION

(75) Inventor: Yanping Guo, Silver Spring, MD (US)

(73) Assignee: The Johns Hopkins University, Baltimore, MD (US)

(*) Notice: Subject to any disclaimer, the term of this patent is extended or adjusted under 35 U.S.C. 154(b) by 0 days.

(21) Appl. No.: 10/129,160
(22) PCT Filed: Jan. 4, 2001
(86) PCT No.: PCT/US01/00185
§ 371 (c)(1), (2), (4) Date: May 1, 2002
(87) PCT Pub. No.: WO01/49565
PCT Pub. Date: Jul. 12, 2001

(65) Prior Publication Data
US 2003/0006345 A1 Jan. 9, 2003

Related U.S. Application Data
(60) Provisional application No. 60/174,502, filed on Jan. 4, 2000.

(51) Int. Cl.[7] ................................................. B64G 1/36
(52) U.S. Cl. ........................................ 244/168; 244/158
(58) Field of Search ................................. 244/158, 164, 244/165, 168; 356/28.5

(56) References Cited

U.S. PATENT DOCUMENTS 4,618,259 A * 10/1986 Czichy et al. ......... 356/139.01
5,189,295 A * 2/1993 Falbel ..................... 250/206.2
5,572,316 A * 11/1996 Zaffanella et al. ...... 356/139.01

FOREIGN PATENT DOCUMENTS

JP          A 10185683     *  7/1998   ............ B64G/1/36

OTHER PUBLICATIONS

Gipsman A et al "Autonomous navigation and guidance system for low thrust driven deep space mission" Sep. 28, 1998 pp. 353–364.*

* cited by examiner

Primary Examiner—Charles T. Jordan
Assistant Examiner—Stephen A Holzen
(74) Attorney, Agent, or Firm—Francis A. Cooch

(57) ABSTRACT

A method and apparatus for autonomous navigation for deep space missions using the sun as the reference body and determining the spacecraft orbit based on observations made on the sun using onboard instruments. Two types of observation data, the direction of the spacecraft relative to the sun as a function of time and the optical Doppler shift due to the motion of the spacecraft relative to the sun, can be used for the spacecraft orbit determination. A dual imaging system which functions as a sun imager taking images of the sun against star backgrounds during the cruise phase and as a regular optical imager taking pictures of the targeting planetary body during the approaching phase is also described.

3 Claims, 4 Drawing Sheets

METHOD AND APPARATUS FOR AUTONOMOUS SOLAR NAVIGATION

CROSS-REFERENCE TO RELATED APPLICATIONS

This application claims the benefit of International Application No PCT/US01/00185, filed Jan. 4, 2001 which claims the benefit of prior filed co-pending U.S. Provisional Patent Application No. 60/174,502, filed on Jan. 4, 2000.

FIELD OF THE INVENTION

The present invention relates generally to interplanetary (deep space) navigation of spacecraft and, more specifically, to a method and apparatus for autonomous, (without using ground-based systems) navigation using the sun.

BACKGROUND OF THE INVENTION

Navigation plays a critical role in deep space missions since a spacecraft launched to a planet, asteroid, or comet must be accurately navigated to reach its destination in a close flyby with, orbit at, or landing on the targeted body. Current navigation systems for interplanetary missions include two types: the ground-based radio Doppler tracking and the onboard optical imaging. In almost every planetary mission to date, the spacecraft navigation has had to rely heavily on the global radio Doppler tracking system, which has 11 Deep Space Network (DSN) antenna dishes of sizes 70 m and 34 m, located in Goldstone, Calif., Canberra, Australia, and Madrid, Spain. The most fundamental radio navigation measurements are the two-way Doppler and range, acquired at S- and X-band frequencies by the DSN. The Doppler and range data are extracted from the incoming radio signals at the tracking stations on the ground and then processed by navigation personnel for estimating and predicting the spacecraft trajectory.

Since the orbit accuracy provided by the ground-based navigation system is insufficient for close encounters with planets or their satellites, an onboard optical navigation system has been developed and applied in many space missions. Optical images of the target planets or their satellites against star backgrounds were obtained through science imaging instruments on board the spacecraft. These optical images were transmitted through DSN to the ground and merged with the Doppler and range data to obtain an orbit determination solution of the spacecraft trajectory.

Autonomous spacecraft navigation is highly desirable for space missions, especially for missions that require updates of a spacecraft's position in real time and that require frequent thrust and trajectory adjustments, such as missions that use solar electric propulsion or solar sails. Autonomous navigation can increase spacecraft's capability and flexibility, taking immediate action in critical situations without any two-way light time delay, thereby increasing the spacecraft's survivability and reducing risk. It also reduces mission operation costs, with daily manual operation being replaced by onboard autonomous operation.

Furthermore, due to the growing number of on-duty spacecraft plus those set to explore the solar system in the next decade, the DSN faces an inevitable communication over-crowding problem. New techniques and systems are becoming increasingly desirable to free up the DSN from time-consuming tasks. For this purpose and also, as noted above, for reducing operational costs in future space missions, the United States National Aeronautics and Space Administration (NASA) has called for the development of more efficient autonomous navigation systems. Autonomous navigation is not only a key element for achieving aggressive low-cost space missions, but also a prerequisite for space missions using solar electric propulsion or solar sails.

As an effort in this direction, a prototypical autonomous optical navigation system has been developed by the Jet Propulsion Laboratory (JPL) for testing in the Deep Space 1 (DS-1) mission. (See S. Bahaskaran, J. E. Riedel, and S. P. Synnott, "Autonomous optical navigation for interplanetary missions," *Space Sciencecraft Control and Tracking in the New Millennium*, E. Kane Casani, M. A. Vander Does, Editors, Proc. *SPIE* vol. 2810, 1996, pp. 32–43; and J. E. Riedel, S. Bhaskaran, S. P. Synnott, W. E. Bollman, and G. W. Null, "An autonomous optical navigation and control system for interplanetary exploration missions," IAA paper IAA-L-0506, *Second IAA International Conference on Low-cost Planetary Missions*, Laurel, Md., April, 1996.) The technique of this optical navigation system is inherited from the Galileo mission. The main objectives of this prototype system are to test the autonomous optical image processing on board the spacecraft and to use the data to determine the spacecraft trajectory without the help from the controllers on earth.

Historically, this optical navigation system has only been used in approach phase. Whether it alone is sufficient to navigate the entire mission is still under study. One of the main limiting factors to the current optical navigation system is the lack of sufficient visible reference bodies with well-known ephemerides during the long cruise time. Bhaskaran et al at JPL indicated in their paper (referenced above) that asteroids would make more viable candidates for uses as beacons than planets due to their proximity and quantity. However, the knowledge of the heliocentric position of the beacon asteroid is required if the asteroid is to be used as the reference. Therefore, for the DS-1 mission that uses asteroids for beacons, a ground-based campaign has been conducted to improve the ephemerides of the beacon asteroids used for the mission. However, if the mission is to explore deeper space, accurate positions of the asteroids there are hardly known, and there will be no easy way to improve the ephemerides of the beacon asteroids before the mission. As a result, the current optical navigation system may not be suitable for cruise in the deeper space missions, such as missions to the outer solar system.

SUMMARY OF THE INVENTION

The autonomous solar navigation method and apparatus of the invention is a completely self-contained autonomous navigation system developed for interplanetary space missions. This navigation system uses only onboard observations of the Sun in combination with the onboard spacecraft attitude data to estimate and predict the spacecraft's orbit autonomously. Unlike the current ground-based navigation system, which uses two-way coherent radio Doppler tracking through the Deep Space Network (DSN), the system of the invention does not need the DSN or any control from the ground. The self-containment allows the spacecraft to navigate independently without relying on signals transmitted from the Earth. In addition, since the Sun is an active energy source and visible everywhere in the universe, this navigation system is applicable to spacecraft moving anywhere in space.

As shown in FIG. 1, the spacecraft's state (its position and velocity vector) is determined by processing the solar observation data on board. Two types of solar data can be used for estimating the state of the spacecraft:

1. The directional data that measures the change in the Sun's direction as a function of time, viewing the Sun from the spacecraft against the star background; and
2. The optical Doppler shifts observed in sunlight that provide the line-of-sight velocity of the spacecraft relative to the Sun.

All of the six orbit elements that define a spacecraft's orbit can be completely determined with measurements of the Sun's direction vector as a function of time. The use of optical Doppler data in addition to the directional data, though optional for orbit determination, adds a constraint in the dimension perpendicular to that given by the directional data. Inclusion of the optical Doppler data in the orbit determination process can speed up the convergence of the orbit fitting process and improve the orbit solution.

The dual-mode imaging system shown in FIG. 2 is designed for measuring the direction of the Sun. It measures the Sun's direction using a charge-coupled device camera by capturing the image of the Sun against a background of stars. The stars appearing in the Sun's image frame serve as a direction reference. The conventional optical imaging system, which is designed for imaging planetary bodies, cannot be directly used for taking the Sun's image because the Sun is much brighter than the planetary bodies. The design of the invention modifies the conventional optical imaging system by controlling the intensity contrast of light coming from objects with large differences in brightness. The designed image system can take pictures from both planetary bodies and the Sun by operating in two modes: as a regular imager when imaging planetary bodies or as a Sun imager when imaging the Sun.

The navigation system's use of the Sun as the navigation reference allows the invention to be used in any mission exploring the solar system, and even for missions to nearby stars. The invention can be used for interplanetary space missions, as well as for missions to explore the Sun. Even for Earth satellites, although communication is convenient with Earth-based navigation systems, such as the DSN or the Global Positioning System (GPS), the system of the invention offers an alternative solution as a jam-proof system. Its complete self-containment makes it invulnerable to any destructive interruptions from the ground, such as high impulsive electromagnetic fields, or jamming radio signals. Aside from its main function as a navigation system, this system can also provide other services. Two additional potential applications are for finding the Earth location after a spacecraft "wakes up" from a safe mode and for providing spacecraft with high-accuracy Earth direction for optical communication.

The autonomous solar navigation method and apparatus of the invention has demonstrated real space mission feasibility and comparable navigation accuracy with current instrument technology. Given its unique ability, self-containment and universal applicability, benefiting from the technology development and innovation in instrument and sensors, the autonomous solar navigation of the invention has great potential in enhancing spacecraft performance in space exploration.

DETAILED DESCRIPTION OF THE FIGURES

DETAILED DISCLOSURE OF THE INVENTION

Figure 1:
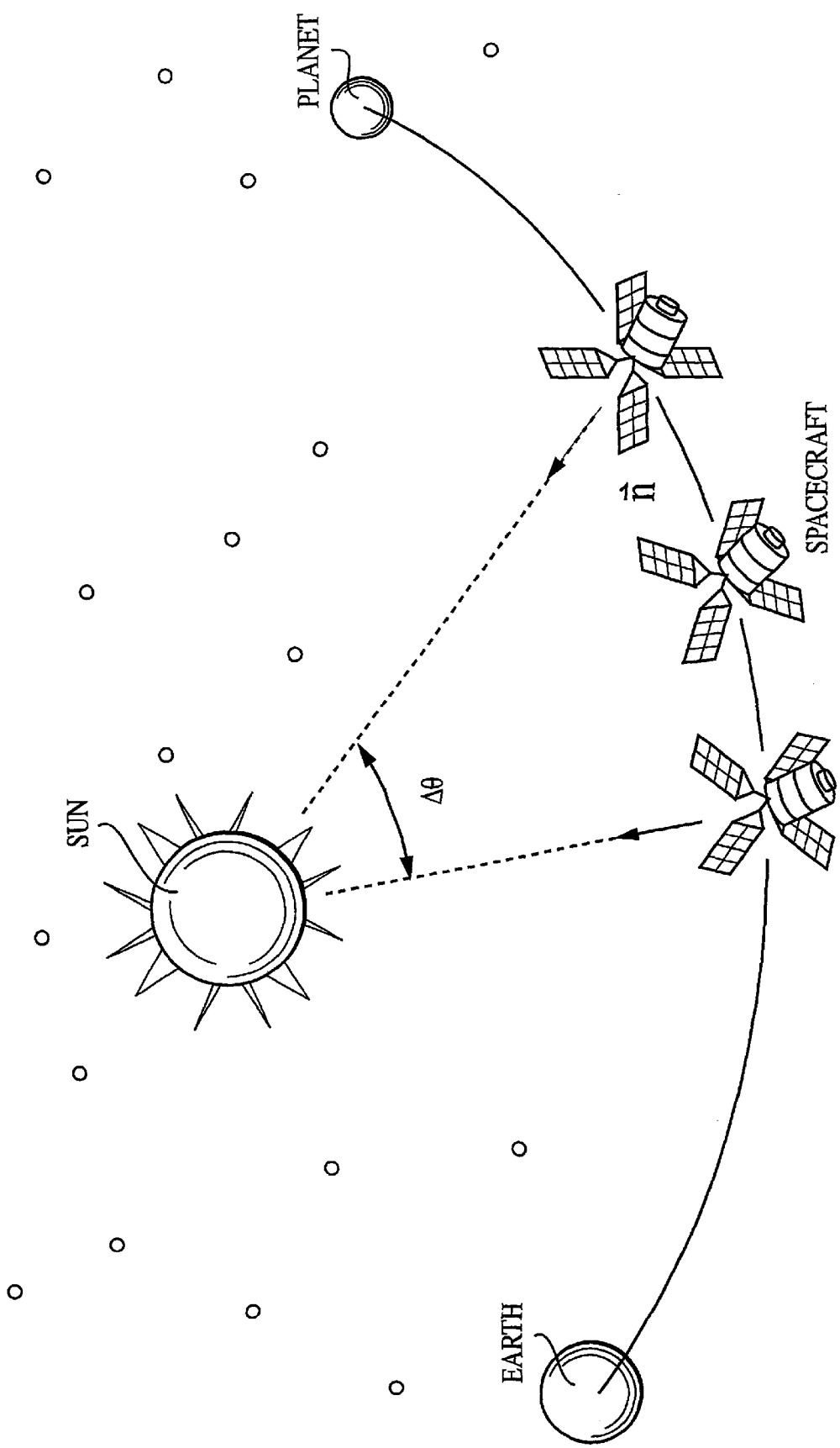
FIG. 1 illustrates an embodiment of the method of the invention wherein spacecraft orbit is determined autonomously on-board via simultaneous observations of the Sun and stars.
Figure 2:
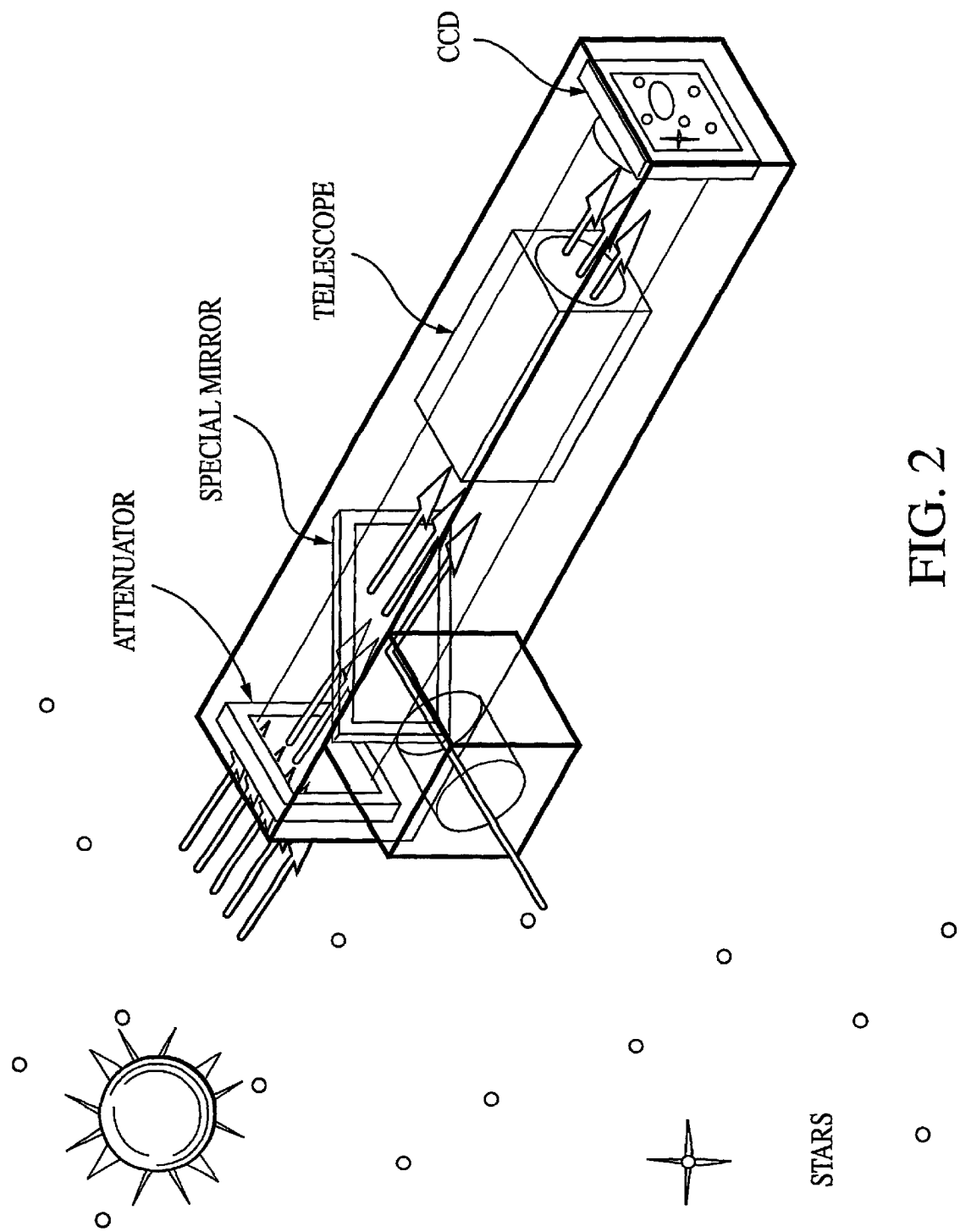
FIG. 2 illustrates an embodiment of a dual-mode imaging system of the invention that is designed to take pictures of the Sun or planetary bodies against the star background.

During interplanetary cruises, especially in the outer solar system, the usable reference bodies are very limited as discussed above. However, the sun, the energy source and central body of the solar system, is a good candidate as the reference body for spacecraft navigation during the cruise phase. First, the sun itself is a permanent illuminating body and radiates energy in a broad spectrum, which provide rich information and signals for utilization. Out of all the potential observation bodies, the sun is the most visible. No matter where the spacecraft is in the solar system, the sun is always visible from the spacecraft. Unlike the planetary bodies, the sun is also an active radiation source which emits electromagnetic signals that can be detected by the spacecraft. Secondly, the sun is the gravitational center of the spacecraft during the interplanetary cruise. The motion of the spacecraft is controlled under the sun's gravity field and its trajectory is a heliocentric orbit about the sun. The spacecraft will be referred directly to its gravity center rather than other planetary bodies that are also orbiting the sun. This direct reference will help to simplify the orbit determination process.

Based on the nature of the sun and its position in the solar system, there are two types of observation data that may be used for solar navigation. The first type is the directional data. The direction of the sun relative to the spacecraft changes as a function of time as the spacecraft moves in space. Depending on the characteristics of the spacecraft orbit and the location of the spacecraft in its orbit, the change rate of the sun direction varies. Spacecraft's state, including its position and velocity vector, can be determined with the directional data.

The second type of data is the Doppler data. As mentioned above, signals radiated from the sun can be detected by the spacecraft. Doppler frequency shifts will be observed in the detected signals due to the motion of the spacecraft relative to the sun. Unlike the conventional two-way Doppler tracking implemented in the ground-based navigation system, the Doppler shifts here will be obtained through passive observations of the sunlight and the analysis of the selected spectral lines. The signal to be used is not in the radio frequency band but in the optical band. It is therefore a passive optical Doppler shift measurement.

There are several methods that can be used to measure the sun direction. One embodiment uses an onboard camera. Past space missions have demonstrated that optical imaging technique used in the optical navigation is very powerful to measure the direction of the observer relative to the observing target. It takes digital images of the target body against star backgrounds using an onboard charge-coupled device (CCD) camera. The background stars in the image serve as a direction reference that gives the camera boresight orientation in the inertial reference frame.

The main limitation with the above method is the resolution of the camera. Its best angular resolution can reach a tenth of a pixel. For an imager with the field of view (FOV) of 1 degree and a CCD array of 1000 by 1000 pixels, the angular resolution per pixel is about 17 micro radians. Angular accuracy on the order of a few micro radians has been achieved in previous missions. However, without the stars in the target image, the camera boresight direction is determined indirectly by the onboard star tracker, and the angular accuracy is usually degraded. Including the stars in the target image is crucial to achieve high accuracy in directional measurements.

Now, with the sun as the observation target, there are some difficulties with the conventional optical imaging techniques, as the sun is much brighter than the planets and their satellites, which only reflect the sunlight. The sun's huge brightness in contrast with the distant stars makes it very hard to form the sun and the stars into the same image. An imaging system that can take images of the sun against star backgrounds is obviously very desirable.

Figure 3:
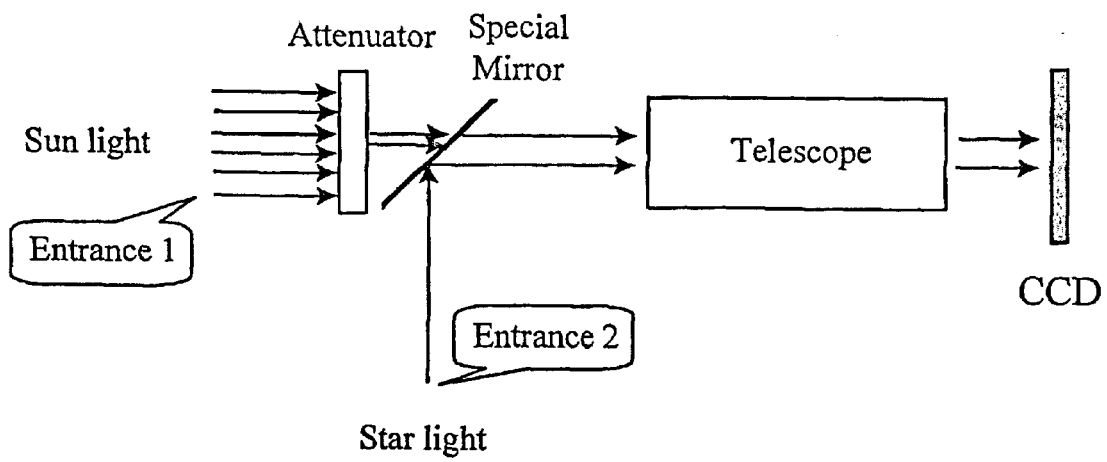
FIG. 3 is a schematic of the embodiment of the dual-mode imaging system of the invention shown in FIG. 2.

The invention accomplishes this with a novel design of a new type imaging system as schematically illustrated in FIG. 3. The difference between this design and the conventional one is that it has two light entrances. A special 45-degree mirror placed in front of the telescope system merges the light coming from both entrances into the same focus system forming a combined image. The intensity of the light entering from entrance 1 is adjustable by using an active mirror which has a tunable transparency, or using an optical attenuator placed in front of the special mirror. Light entering from entrance 2 is reflected to the focus by the special mirror without any substantial attenuation. This imaging system can consequently control the intensity contrast of light coming from objects with large differences in brightness.

The imaging system shown in FIG. 3 can operate in two modes. In mode 1, it acts as a sun imager. Light coming from the sun enters the imaging system from entrance 1 and its intensity is greatly reduced after passing through the mirror so that it becomes comparable to the starlight. Light coming from the stars which is roughly 90 degrees from the sun direction enters the imaging system from entrance 2, and it is almost fully reflected by the special mirror before merging with the sun light. The merged sunlight and starlight then enter the telescope system and are focused on the CCD placed at the focal plane of the telescope, forming a single composite digital image.

In mode 2, the imaging system closes entrance 1 by tuning the attenuator to maximum or the transparency of the mirror to zero so that light from entrance 1 is totally blocked. Lights coming from the observing body and from the stars now both enter the imaging system from entrance 2. The system, therefore, acts just like a conventional optical imaging system, and it will be used during the approach phase for taking images of the target planetary body. It may also be used for obtaining planetary body images during the cruise phase if it is desired.

Passive Doppler shift measurements have had wide applications in astronomy and weather observations. Since the 1960s, this technique has been used to estimate the velocity of distant stars in astronomy. Spectral analysis is also a main tool for solar observations, and with it scientists have discovered many significant phenomena at the solar surface. Turning the view from distant bodies to near ones, the passive Doppler shift technique has also been used to measure wind velocities in the upper atmosphere. In these examples, the Doppler frequency shift is observed in the infrared or visible band.

If the relative distance between a source radiating at frequency f and an observer varies, the signal received by the observer will have a frequency f', which is different than f, the difference, $f_d = f' - f$, is called the Doppler shift. The relationship between $f_d$ and f is $$f_d = f \frac{v}{c} \qquad (1)$$

Where v is the line of sight velocity of the observer relative to the source, and c the speed of light.

It is noted from the above expression that the Doppler shift is proportional to the signal frequency. The shift will be greater if the signal frequency is higher. Table 1 gives an example for comparison.

TABLE 1

DOPPLER SHIFT COMPARISON

| Line of Slight Velocity | SignaL Frequency | Doppler Shift |
|---|---|---|
| 1 mm/s | $8 \times 10^9$ Hz (radio) | 0.027 Hz |
| 1 mm/s | $5 \times 10^{14}$ Hz (visible) | 1667 Hz |

The radio Doppler shift is so small that the shift is less than 3 hundredth Hertz for a relative motion of 1 mm/s. However, with the same moving velocity, the Doppler shift at the visible is more than sixteen hundred Hertz.

As an active energy source, the sun's radiation spectrum covers a broad band, and about 40% of it are in the visible. Many discrete absorption lines in the spectrum can be selected as the signals for observing the Doppler shift due to spacecraft motion relative to the sun. The measurement methods of the Doppler shift are different at the optical from that at the radio. For the radio signal, the small frequency shift is obtained by measuring the phase shift over an accumulated period, typically 60 seconds. It requires the knowledge of the initial and final phases of the signal. At the optical band, the Doppler shift is so large that instantaneous measurement can be performed. One technique uses the electro-optical modulator, and another one uses resonance scattering. It has been reported that with the resonance-scattering spectrometer, it is possible to measure the solar pulsations with velocities less than 1 cm/s.

The functions of any navigation system are to estimate the spacecraft's current state, position and velocity vector, and to predict the spacecraft's future trajectory. As described above, there are two types of solar data that may be used in the method of the invention for the determination of spacecraft's state. The sun directional data is sufficient to determine the spacecraft state. However, using the combination of both data types will accelerate the convergence of orbit fitting iteration and improve the accuracy of the orbit solution.

Spacecraft orbit determination based on the Doppler shift measurement has been a standard method used in the current navigation system. With this method, the range rate of the spacecraft in the line of sight is observed through the measurement of frequency shift due to the Doppler effect. Orbit elements or spacecraft state vector is related to the range rate. Orbit determination theory using Doppler data as well as orbit fitting and data process techniques have been well developed over the past three decades.

However, the invention's use of solar directional data to determine the orbit is new; the spacecraft orbit can be completely determined by measuring the spacecraft direction relative to the sun as a function of time. More generally, the orbit can be determined if the direction vector from the obiter to its gravity center is known.

Figure 4:
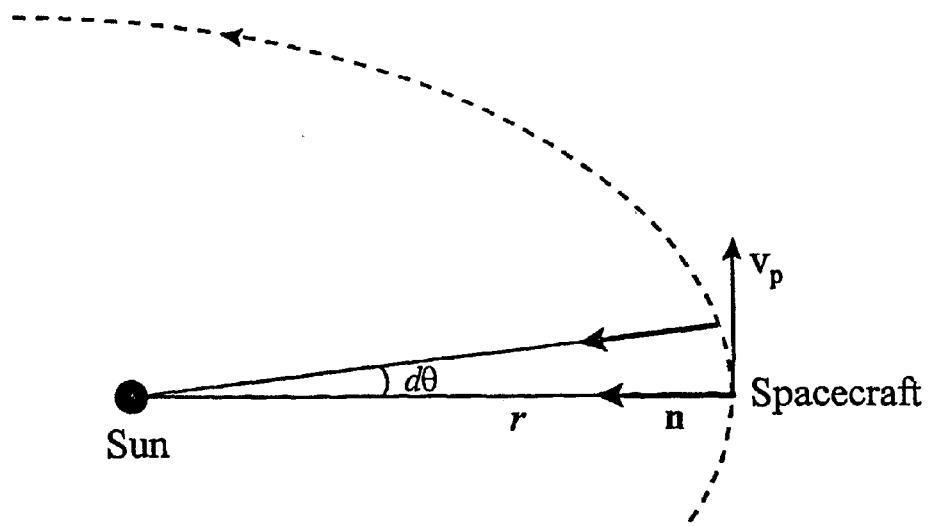
FIG. 4 is a schematic of a spacecraft orbiting the sun.

Considering the interplanetary cruise phase that the trajectory of the spacecraft is a heliocentric elliptical orbit about the sun, the directional unit vector, n, from the spacecraft to the center of mass of the sun is measured as a function of time, as illustrated in FIG. 4. Therefore, the angular rate of the spacecraft moving in its orbit is derivable from this measurement. With the assumption that the motion of the spacecraft about the sun is a Keplerian motion, the orbit can be completely specified by six scalars. The six classical orbital elements commonly used to define the orbit are the semimajor axis a, the eccentricity e, the time of perihelion passage $t_p$, the right ascension of the ascending node $\Omega$, the orbital inclination i, and the argument of the perihelion $\omega$. The first 3 elements determine the shape and size of the orbit, while the last 3 elements specify the orientation of the orbit in space.

To evaluate the orbit determinacy, the expression of the observed quantity in terms of the orbital elements is first derived. As shown in FIG. 4, $$rd\theta = v_p dt \quad (2)$$

Where r is the distance from spacecraft to the center of mass of the sun, $v_p$ is the velocity component of the spacecraft perpendicular to the position vector $r(=-\hat{n}r)$, $d\theta$ is the angular change of spacecraft position during the time period of dt. $v_p$ is related to the angular momentum H by $$H = rv_p \quad (3)$$

Substituting with $$H = \sqrt{\mu a(1-e^2)} \quad (4)$$

results in $$v_p = \frac{1}{r}\sqrt{\mu a(1-e^2)} \quad (5)$$

Where $\mu$ is the GM constant of the sun.

Figure 5:
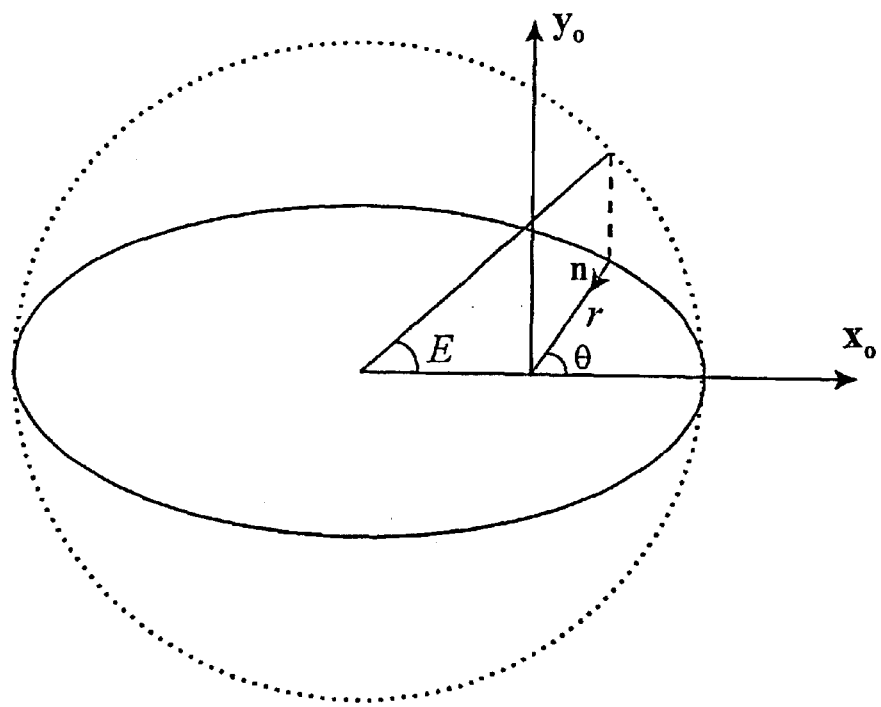
FIG. 5 is a schematic of the geometry of the orbit.

FIG. 5 shows the geometry of the orbit. The sun is located at one of the focuses of the elliptic orbit, which is also the coordinate system origin. The unit vector $x_o$ points toward perihelion, $z_o$ points along the angular momentum direction, i.e., normal to the orbit plane, and $y_o$ is defined such that $\{\hat{x}_o, \hat{y}_o, \hat{z}_o\}$ forms a right-handed coordinate system. With the help of the geometrical relationships, the spacecraft position, r, can be expressed in terms of the orbit elements as $$r = a(1 - e\cos E) \quad (6)$$

The eccentric anomaly E in the equation is related to the orbital elements through Kepler's equation $$E - e\sin E = \sqrt{\frac{\mu}{a^3}}(t - t_p) \quad (7)$$

Combining Eqs. (2), (5), and (6), we obtain $$\dot{\theta} \equiv \frac{d\theta}{dt} = \frac{\sqrt{\mu a(1-e^2)}}{a^2(1-e\cos E)^2} \quad (8)$$

Equation (8) relates the angular rate to orbital elements a, e, and the eccentric anomaly E. Since E is a function of a, e, and $t_p$, as expressed in Eq. (7), the angular rate is now a function of the orbital elements a, e, and $t_p$, which are the elements specifying the shape and size of the orbit.

The derivatives of the angular rate with respect to the three orbital elements are now computed. From Eq. (7), the derivatives of the eccentric anomaly E with respect to a, e, and $t_p$ are obtained, $$\frac{\partial E}{\partial a} = \frac{-\frac{3}{2}\mu^{\frac{1}{2}}a^{-\frac{5}{2}}(t-t_p)}{1-e\cos E} \quad (9)$$

$$\frac{\partial E}{\partial e} = \frac{\sin E}{1-e\cos E} \quad (10)$$

$$\frac{\partial E}{\partial t_p} = -\frac{\mu^{\frac{1}{2}}a^{-\frac{3}{2}}}{1-e\cos E} \quad (11)$$

and then substituted into the differential equations of the angular rate $\dot{\theta}$, which are derived from Eq. (8)

$$\frac{\partial \dot{\theta}}{\partial a} = -\frac{\mu^{\frac{1}{2}}a^{-\frac{3}{2}}\sqrt{1-e^2}}{(1-e\cos E)^2}\left(\frac{3}{2a} + \frac{2e\sin E}{1-e\cos E}\frac{\partial E}{\partial a}\right) \quad (12)$$

$$\frac{\partial \dot{\theta}}{\partial e} = -\frac{\mu^{\frac{1}{2}}a^{-\frac{3}{2}}}{(1-e\cos E)^2}\left\{\frac{e}{\sqrt{1-e^2}} - \frac{2\sqrt{1-e^2}}{1-e\cos E}\left(\cos E - e\sin E\frac{\partial E}{\partial e}\right)\right\} \quad (13)$$

$$\frac{\partial \dot{\theta}}{\partial t_p} = -\frac{2e\sin E \mu^{\frac{1}{2}}a^{-\frac{3}{2}}\sqrt{1-e^2}}{(1-e\cos E)^3}\frac{\partial E}{\partial t_p} \quad (14)$$

The final expressions of the angular rate derivatives with respect to the orbital elements become $$\frac{\partial \dot{\theta}}{\partial a} = \frac{-\frac{3}{2}\mu^{\frac{1}{2}}a^{-\frac{5}{2}}}{(1-e\cos E)^4}\{1 - 2e(\cos E + E\sin E) + e^2(1+\sin^2 E)\} \quad (15)$$

$$\frac{\partial \dot{\theta}}{\partial e} = \frac{-\mu^{\frac{1}{2}}a^{-\frac{3}{2}}}{\sqrt{1-e^2}(1-e\cos E)^4}\{3e - e^3(1+\sin^2 E) - 2\cos E\} \quad (16)$$

$$\frac{\partial \dot{\theta}}{\partial t_p} = \frac{2\mu a^{-3}e\sin E\sqrt{1-e^2}}{(1-e\cos E)^4} \quad (17)$$

Whether the three orbital elements, a, e, and $t_p$, can be determined from the observation of the angular rate depends on the matrix of the partial derivatives of $\dot{\theta}$ with respect to these elements. If the matrix is a nonsingular matrix, it will be possible to solve for the elements. It is observed from Eqs. (15)–(17) that the three derivative functions are linearly independent functions of E, so that the three orbital elements a, e, and $t_p$, can be determined. It is noticed in the case of $$e = 0 \quad (18)$$

Equation (17) becomes $$\frac{\partial \dot{\theta}}{\partial t_p} = 0 \quad (19)$$

This indicates that the time of perihelion passage is indeterminable for the case of circular orbit, as expected.

So far three of the six classical orbital elements have been shown to be determinable from the spacecraft angular rate which is derivable from the measurement of the spacecraft direction to the sun as a function of time. The other three orbital elements, $\Omega$, i, and $\omega$, which specify the orientation of the orbit, are to be determined below.

Figure 6:
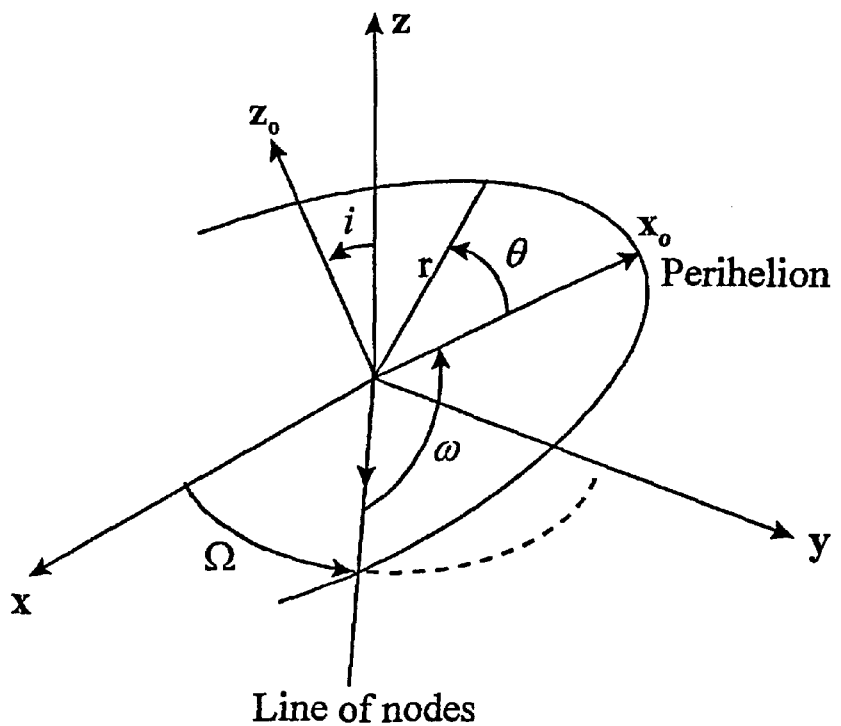
FIG. 6 is a schematic of spacecraft orbit orientation in the sun-centered inertial coordinate system.

The orientation of the spacecraft orbit about the sun is specified in a sun-centered inertial coordinate system $\{\hat{x}, \hat{y},$ $\hat{z}$} as shown in FIG. 6. It is obvious from FIG. 5 that the direction vector n can be written as $$-\hat{n} = \cos\theta \hat{x}_o + \sin\theta \hat{y}_o \qquad (20)$$

The unit vectors $x_o$ and $y_o$ in the inertial coordinate system are expressed in terms of the right ascension of the ascending node $\Omega$, the orbital inclination i, and the argument of the perihelion $\omega$, $$\hat{x}_o = (\cos\Omega\cos\omega - \sin\Omega\sin\omega\cos i)\hat{x} + (\sin\Omega\cos\omega + \cos\Omega\sin\omega\cos i)\hat{y} + \sin i \sin\omega \hat{z} \qquad (21)$$

$$\hat{y}_o = -(\cos\Omega\sin\omega + \sin\Omega\cos\omega\cos i)\hat{x} + (-\sin\Omega\sin\omega + \cos\Omega\cos\omega\cos i)\hat{y} + \sin i \cos\omega \hat{z} \qquad (22)$$

The direction vector n in the inertial coordinate system is then obtained by substituting Eqs. (21) and (22) into Eq. (20), and the resulting expression is $$\hat{n} = [-\cos\Omega\cos(\omega+\theta) + \sin\Omega\sin(\omega+\theta)\cos i]\hat{x} - [\sin\Omega\cos(\omega+\theta) + \cos\Omega\sin(\omega+\theta)\cos i]\hat{y} - \sin i \sin(\omega+\theta)\hat{z} \qquad (2)$$

It is a function of the orbital elements $\Omega$, i, $\omega$, and the true anomaly $\theta$. Therefore the partial derivatives of the direction vector with respect to the orbital elements may be computed from Eq. (23)

$$\frac{\partial \hat{n}}{\partial \Omega} = [\sin\Omega\cos(\omega+\theta) + \cos\Omega\sin(\omega+\theta)\cos i]\hat{x} - [\cos\Omega\cos(\omega+\theta) - \sin\Omega\sin(\omega+\theta)\cos i]\hat{y} \qquad (24)$$

$$\frac{\partial \hat{n}}{\partial \omega} = [\cos\Omega\sin(\omega+\theta) + \sin\Omega\cos(\omega+\theta)\cos i]\hat{x} + [\sin\Omega\sin(\omega+\theta) - \cos\Omega\cos(\omega+\theta)\cos i]\hat{y} - \cos(\omega+\theta)\sin i \hat{z} \qquad (25)$$

$$\frac{\partial \hat{n}}{\partial i} = -\sin\Omega\sin(\omega+\theta)\sin i \hat{x} + \cos\Omega\sin(\omega+\theta)\sin i \hat{y} - \sin(\omega+\theta)\cos i \hat{z} \qquad (26)$$

Examining partial differential Equations (24–26), they are again three linearly independent vector functions of the true anomaly. This indicates that the orbital elements $\Omega$, i, and $\omega$ are all determinable from the Sun direction vector measurements. Now all six orbital elements a, e, $t_p$, $\Omega$, i, and $\omega$, have been shown to be uniquely determinable based on the measurement of the sun direction vector. In other words, the spacecraft orbit can be completely determined with only the directional data. An algorithm for numerically determining the orbit of the spacecraft using the least squares method to fit the orbit parameters with the solar directional data has been developed.

The practicality and feasibility of using solar navigation was assessed by applying it to a real space mission. The Solar-TErrestrial Relations Observatory (STEREO) mission was selected as a case study because its available onboard science instrument (the Solar Coronal Imaging Package) can measure the Sun's direction with no additional hardware being required. The STEREO mission, which will be launched at the end of 2004, will provide a new perspective on solar eruptions (coronal mass ejections) and their consequences for Earth by imaging the ejections and background events from two spacecraft simultaneously.

An orbit determination based on the mission trajectory profile and onboard instrument and system capability for the STEREO mission was simulated. Sun direction measurement errors contributed from the science instrument and the guidance system were considered and folded into the simulated observation data. The simulated Sun direction data was used to estimate the spacecraft's position and velocity vector. Orbit estimation errors were derived by comparing the estimated values with the truth model.

The results from the simulations performed on STEREO show that an orbit solution better than ±200 km can be achieved by solar navigation using the available onboard science instrument and the guidance and control system. It is well below the mission required uncertainty limit of ±7500 km.

The invention's autonomous navigation method and apparatus for deep space missions uses the sun as the navigation reference during the interplanetary cruise phase where usable planetary bodies are limited by visibility and distance. This solar navigation is completely self-contained, and it guides the spacecraft through passive observation of the sun with onboard instruments.

Two types of observation data can be used for the spacecraft orbit determination: the direction of the sun with respect to the spacecraft and the optical Doppler shift due to the relative motion of the spacecraft to the sun. As discussed above, the directional data alone can completely determine the orbit. While the Doppler data alone can also determine the spacecraft state, using the combination of both the directional data and the Doppler data can accelerate the convergence of orbit fitting iteration and improve the accuracy of the orbit solution.

For measuring the direction of the sun, which is much brighter than the background objects, the invention comprises the dual-mode imaging system disclosed above. The system has two functions. In one mode, it functions as a sun imager that allows the sun image to be taken with the stars in the background. In the other mode, it works as a regular optical imager that can be used for taking images of planetary bodies during approaching phase.

Solar navigation that uses the sun as the navigation reference and determines the spacecraft orbit based on the measurements made on the sun using onboard instruments has many advantages over other navigation systems. It is completely self-contained and needs no feeds or control from the earth, and therefore it has no dependence on DSN. It has the potential to guide spacecraft voyaging anywhere in the solar system, inner or outer solar system. It can then be used for deep space missions such as to the most distant planet, Pluto. In addition, it is also cost-efficient because navigation in different missions uses the same body—the sun as the reference body, results and improvements made on the sun's parameters obtained from previous missions can directly benefit future missions. This will lead to a great saving on operations for future missions.

What is claimed is:

1. A method for autonomous solar navigation of a spacecraft comprising the step of measuring the direction of the sun relative to the spacecraft as a function of time to determine the spacecraft location and velocity, comprising the steps of:

measuring a set of sun-direction vectors;

deriving a set of angular rates of the spacecraft relative to the sun based on the set of sun-direction vectors; and determining the location and velocity of the spacecraft relative to the sun based on the set of sun-direction vectors and the set of spacecraft angular rates.

2. The method as recited in claim 1, further comprising the steps of:

measuring the frequency shift in the optical band due to the Doppler effect by observing the sun to determine the line-of-sight velocity of the spacecraft relative to the sun; and combining the Doppler shift measurement with the sun-spacecraft direction measurement to determine the spacecraft location and velocity.

3. A method for autonomous solar navigation of a spacecraft comprising the steps of:

measuring the direction of the sun relative to the spacecraft as a function of time to determine the spacecraft location;

measuring the frequency shift in the optical band due to the Doppler effect by observing the sun to determine the line-of-sight velocity of the spacecraft relative to the sun; and combining the Doppler shift measurement with the sun-spacecraft direction measurement to determine the spacecraft location.

* * * * *